Dec. 19, 1939.          J. W. McFARLANE          2,184,015
                     ATTACHMENT FOR CAMERAS
                       Filed Jan. 7, 1937
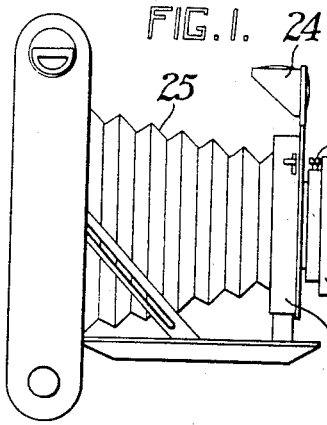
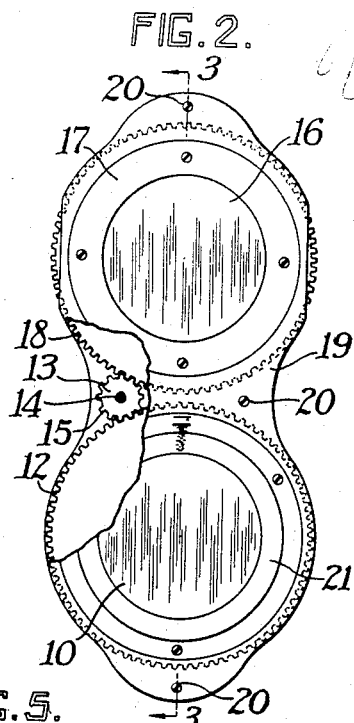
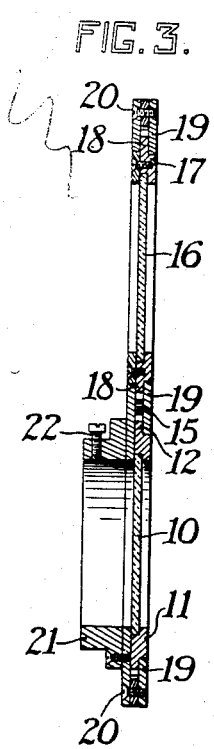
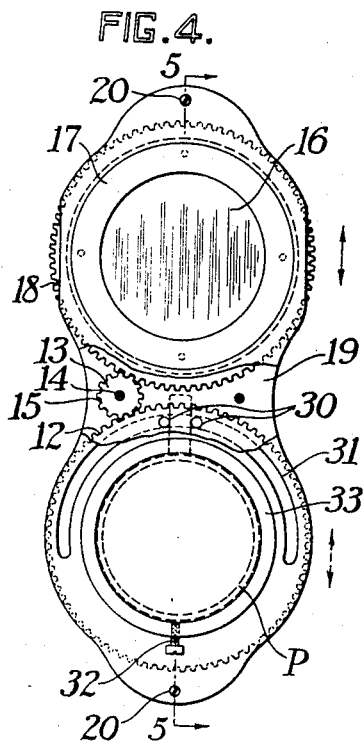
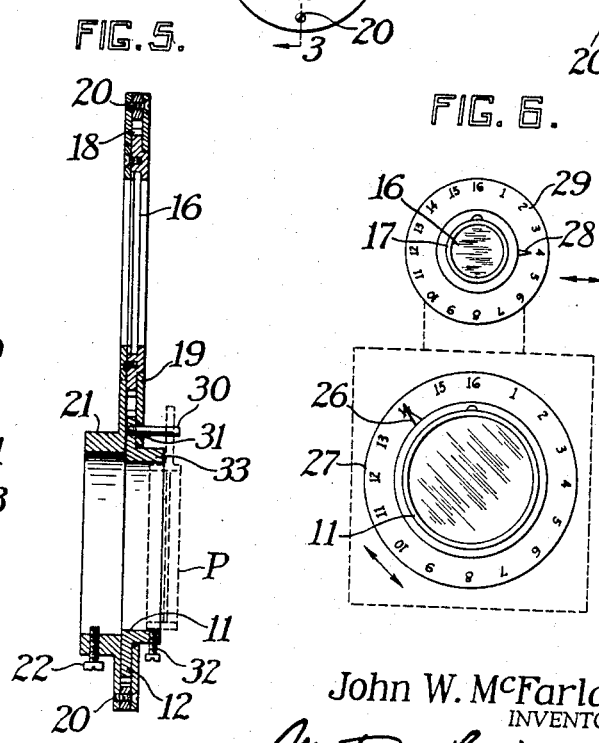
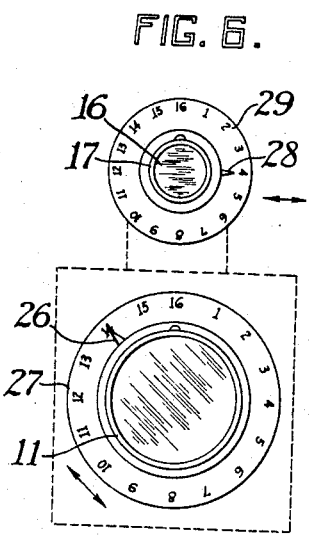
John W. McFarlane
INVENTOR.
BY
ATTORNEYS Patented Dec. 19, 1939

2,184,015

UNITED STATES PATENT OFFICE 2,184,015

ATTACHMENT FOR CAMERAS

John W. McFarlane, Rochester, N. Y., assignor to Eastman Kodak Company, Rochester, N. Y., a corporation of New Jersey Application January 7, 1937, Serial No. 119,478

1 Claim. (Cl. 95—64)

This invention relates to light filters of the kind which polarize light. More particularly, it relates to the photographic uses of sheet polarizing materials.

According to the wave theory of light propagation, ordinary light may be considered as vibrating in all directions perpendicular to its direction of propagation. For many years, it has been known that ordinary light on passing through a polarizer, such as a Nicol prism, becomes polarized with the planes of vibration of the emergent light, mutually parallel. The orientation of the planes of vibration is determined by the structure of the polarizer with respect to which there is thus a unique direction which, for convenience in describing the invention, I call the "vibration axis" of the polarizer.

When using cameras which permit ground glass focusing, it is a relatively simple matter, by examining the image on the ground glass, to determine the effect of rotating a polarizer in front of the camera lens. However, since all cameras are not so equipped, it is desirable to have an arrangement for examining the scene which is being photographed either directly through part of the polarizing screen which is used over the camera lens or through an auxiliary polarizing screen which is oriented so that its vibration axis is parallel to the vibration axis of the camera lens filter. It is an object of the present invention to provide a means for accomplishing this.

It is a particular object of the invention to provide an auxiliary polarizing filter which is coupled to the camera lens polarizing filter so that their vibration axes are always parallel and which may be positioned to act as a filter over a view finder of the direct vision type or of the reflecting type such as a brilliant finder. It is also possible to use such an auxiliary polarizer for viewing the scene directly, that is, not in conjunction with any of the conventional types of finders.

Other objects and advantages of the invention will become apparent from the following description when read in connection with the accompanying drawing in which, Figure 1 shows one form of the invention mounted on a camera having a reflecting type finder.

Figure 2 shows a front elevation partially broken away of one form of the invention in which a direct gear arrangement is used.

Figure 3 shows a central vertical section of the form of the invention shown in Figure 2.

Figures 4 and 5 are similar to Figures 2 and 3, and show an embodiment of the invention wherein the view examiner polarizer and the accompanying gear train form a separate and auxiliary attachment for the camera lens polarizing filter.

Figure 6 shows an elevation of a modified form of the invention.

In Figure 1, a polarizing screen 10 rotatably secured in a frame 19 is mounted in front of the objective of a camera 25 by means of an annular mount 21 provided with a set screw 22. The frame 19 also supports an auxiliary polarizing filter 16 which cooperates with a view finder 24 provided on the camera 25 and shown mounted on the lens board 23 thereof. The polarizing screen 10 and the polarizer 16 are rotatably mounted in the frame 19 and coupled together so that the vibration axes of the two polarizers are parallel for all angular positions of the screen 10. Thus, the effect of the screen 10 on the image in the camera 25 will be similar to that seen in the finder 24.

Similar reference numerals are used to indicate similar units in all of the figures. In Figure 2, the polarizing filter 10 is shown mounted in a ring 11 carried by a gear 12. Reference to Figure 3 will disclose how this ring 11 is rotatably mounted in the frame 19. Cooperating with the gear 12 is a small gear 13 mounted on a pin 14 so that its teeth 15 are in mesh with the teeth of the gear 12. The pin 14 together with rivets 20 supports the two parts of the frame 19 between which the gears are located. The auxiliary polarizing filter 16 is mounted, in a manner similar to that of the polarizing screen 10, in a ring 17 rotatably supported in the frame 19 and carried by a gear 18 whose teeth are in mesh with the teeth 15 of the small gear 13. Rotation of the polarizing screen 10 is transmitted through the three gears to give an equal rotation in the same direction to the auxiliary polarizer 16. The two polarizing filters 10 and 16 are preferably made of the same material but not necessarily so.

Further reference to Figure 3 shows the annular mount 21 rigidly attached to the frame 19 and carrying the set screw 22, all of which provide a convenient method of mounting the polarizing filter 10 over a camera lens as shown in Figure 1.

In copending application, Serial Number 119,479, filed January 7, 1937, Patent Number 2,132,694, October 11, 1938, I describe a polarizing filter having an indicator handle. A convenient embodiment of the present invention which may be adapted for use with that polarizing filter is shown in Figures 4 and 5. In this embodiment the filter 10 is replaced by a detachable polarizing filter P, such as that just mentioned, in a separate mount shown by broken lines. The mount is supported by a set screw 32 and an annular ring 33 which is integrally attached to the ring 11. The indicator handle of the detachable polarizing filter P is placed between and moved by two studs 30 which project from the ring 11 (gear 12) through a semi-circular slot, 31, in the front plate of the frame 19. The two studs 30 are so positioned on the ring 11 that when the indicator handle is between the studs, the vibration axes of the camera lens filter and the view examiner filter are parallel.

When using the invention, the polarizing filter 10 or the detachable polarizing filter P mounted in the ring 33, is placed over a camera lens as discussed above, and the auxiliary filter 16 projects to one side of the camera so that the scene to be photographed may be examined directly. In the preferable embodiment of the invention, however, the auxiliary filter 16 intercepts the light entering the view finder of the camera and polarizes it in a manner identical with that of the light transmitted by the polarizing screen 10. The invention may be used on any suitable form of camera or motion picture camera. Also, it is to be understood that the invention is not confined to the simple form of gear arrangement shown. Many equivalent arrangements will immediately suggest themselves. Figure 6 shows an arrangement wherein direct mechanical linkage between the two filters is eliminated. In this case, the polarizing screen 10 is provided with an index 26 mounted on the ring 11 and a scale 27 to indicate the degree to which the screen 10 has been rotated. A similar index 28 and scale 29 are provided for the auxiliary polarizer 16. To operate this form of the invention, the auxiliary filter 16 is rotated until the desired artistic effect is obtained visually and then the polarizing screen 10 is rotated until its index 26 is opposite to the scale number corresponding to the setting of the auxiliary filter 16 as indicated by the index 28 and scale 29. The embodiment of the invention providing automatic mechanical coupling between the polarizers such as shown in Figure 2 is preferable, however.

It is to be understood that the invention is not confined to the specific structures which have been shown and described for illustrating the invention but is of the scope of the appended claim.

What I claim and wish to secure by Letters Patent of the United States is:

A view examiner polarizer attachment adapted to be used with a camera over the lens of which a polarizing filter having an indicator handle is rotatably mounted, which view examiner polarizer comprises a polarizing material, a mount for the material, a frame rotatably supporting the mount, attaching means for detachably and rigidly securing the frame to the camera, a second mount rotatably supported by the frame and positioned to cooperate with the filter, gripping means carried by the second mount and positioned and shaped to engage said indicator handle, so that rotation of the filter is transmitted by the gripping means to rotate the second mount, and coupling means between the two mounts so arranged that a given rotation in one direction of one mount produces an equal rotation in the same direction of the other mount, the vibration axis of the polarizing material being so oriented relative to said gripping means that when the indicator handle is engaged by the gripping means, said vibration axis is parallel to the vibration axis of the filter.

JOHN W. McFARLANE.